US008065659B1

(12) United States Patent
Prince et al.

(10) Patent No.: US 8,065,659 B1
(45) Date of Patent: Nov. 22, 2011

(54) METHOD AND APPARATUS FOR EXECUTING SCRIPTS WITHIN A WEB BROWSER

(75) Inventors: Christopher M. Prince, San Francisco, CA (US); Andrew J. Palay, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1210 days.

(21) Appl. No.: 11/809,160

(22) Filed: May 30, 2007

(51) Int. Cl.
*G06F 9/44* (2006.01)
(52) U.S. Cl. ........................................ 717/115
(58) Field of Classification Search ........... 717/114–116
See application file for complete search history.

(56) References Cited

U.S. PATENT DOCUMENTS

| 7,814,410 | B2 * | 10/2010 | Kothari et al. | 715/234 |
| 7,958,453 | B1 * | 6/2011 | Taing | 715/744 |
| 2006/0031663 | A1 * | 2/2006 | Peller et al. | 712/245 |
| 2007/0055731 | A1 * | 3/2007 | Thibeault | 709/204 |

* cited by examiner

*Primary Examiner* — Anna Deng
(74) *Attorney, Agent, or Firm* — Park, Vaughan, Fleming & Dowler LLP

(57) ABSTRACT

One embodiment of the present invention provides a system that extends a scripting language native to a web browser to facilitate executing scripts within a web browser. During operation, the system receives a first command from a root script to initialize a first worker script within a web browser. In response to the first command, the system: creates a first operating-system thread, wherein the first operating-system thread is associated with a first message queue; starts a first worker script-engine using the first operating-system thread; receives a first message at the first message queue to execute the first worker script; and in response to the first message, executes the first worker script within the first worker script-engine.

18 Claims, 5 Drawing Sheets

```
// Creates a JavaScript worker with fullScript as the entire body of
// code for that JavaScript engine.
//
// Returns the ID of the created worker.  Worker IDs are guaranteed to
// be positive integers that are never reused within a pool.
//
// The fullScript code is guaranteed to run once before createThread()
// returns.  The code must set an onmessage handler (see below) during
// that time, otherwise the worker will never receive messages.
//
// Workers lack most browser context available to regular script code.
// For example, 'window' and the rest of the DOM does not exist.
//
// Created workers do have two objects in their global namespace:
// - google.scour.workerPool: Gives access to the pool that created this
//      worker. Set its onmessage property to receive messages.
// - google.scour.factory: Provides a Scour factory.

int createThread(string fullScript)

// Specifies the handler function to call when a message is received.
//
// The function will be invoked with these arguments:
//    onmessage(string message, int fromWorker)

[read/write] property onmessage

// Sends message to the specified worker. Messages are always strings.
// Messages sent from worker 1 to worker 2 in a particular order will
// always be received in the same order.

void sendMessage(string message, int toWorker)
```

FIG. 5

METHOD AND APPARATUS FOR EXECUTING SCRIPTS WITHIN A WEB BROWSER

BACKGROUND

1. Field of the Invention

The present invention relates to web browsers. More specifically, the present invention relates to a method and an apparatus for executing scripts within a web browser.

2. Related Art

As web applications become increasingly complex, scripting systems are often used to handle some of the more complex tasks. However, scripting systems are presently defined as single-threaded systems with sequential event models. This means that one event handler must return before the next event handler will execute.

This single-threaded model creates problems for complex web applications. For example, during the execution of a time-consuming operation, such as a heavy computational operation or a large input/output operation, the time-consuming operation will block all subsequent operations on the page. In some cases, this blocking can lead a user to believe that his or her browser has locked up. Furthermore, in some web browsers, the time-consuming operation will also block every other page which is open in a tab or window in the same browser process.

In order to alleviate this problem, some scripting systems allow an application to manually split large operations into smaller units. This allows an associated script engine to yield to a central manager after each of the smaller units. However, splitting large operations into smaller units is tedious and difficult, and requires additional bookkeeping, which can cause a significant performance degradation.

Hence, what is needed is a method and an apparatus for executing time-consuming operations within a browser without the problems listed above.

SUMMARY

One embodiment of the present invention provides a system that extends a scripting language native to a web browser to facilitate executing scripts within a web browser. During operation, the system receives a first command from a root script to initialize a first worker script within a web browser. In response to the first command, the system: creates a first operating-system thread, wherein the first operating-system thread is associated with a first message queue; starts a first worker script-engine using the first operating-system thread; receives a first message at the first message queue to execute the first worker script; and in response to the first message, executes the first worker script within the first worker script-engine.

In some embodiments of the present invention, the system receives a second command from the root script to initialize a second worker script within the web browser. In response to the second command, the system: creates a second operating-system thread, wherein the second operating-system thread is associated with a second message queue; starts a second worker script-engine using the second operating-system thread; receives a second message at the second message queue to execute the second worker script; and in response to the second message, executes the second worker script within the second worker script-engine. Note that the first thread and the second thread are executed in parallel.

In some embodiments of the present invention, the system receives the root script within the web browser. Next, the system creates a primary operating-system thread, wherein the primary operating-system thread is associated with a primary message queue. Then, the system starts a primary script-engine using the primary operating-system thread. Finally, the system executes the root script within the primary script-engine. The root script then creates the first command, the second command, the first message, and the second message.

In some embodiments of the present invention, the system receives a first status message from the first worker script at the primary message queue. The system also receives a second status message from the second worker script at the primary message queue.

In some embodiments of the present invention, the system receives a third command to initialize a third worker script within the web browser. In response to the third command, the system: creates a third operating-system thread, wherein the third operating-system thread is associated with a third message queue; starts a third worker script-engine using the third operating-system thread; receives a third message at the third message queue to execute the third worker script; and in response to the third message, executes the third worker script within the third worker script-engine. Note that the first worker script creates the third command and the third message.

In some embodiments of the present invention, a worker script can send messages to and receive messages from any other worker script. For example, the first worker script may send a message to the second worker script instructing the second worker script to perform a task. Likewise, the second worker script may send a message to the first worker script requesting that the first worker script perform a task.

In some embodiments of the present invention, the system creates the first operating-system thread by creating a first identifier for the first operating-system thread, and returning the first identifier to the root script. The system also creates the second operating-system thread by creating a second identifier for the second operating-system thread, and returning the second identifier to the root script. In some embodiments of the present invention, the root script controls the creation of the first operating-system thread and the second operating-system thread.

In some embodiments of the present invention, the first command includes a first Uniform Resource Locator (URL) that specifies the location of the first worker script, and the second command includes a second URL that specifies the location of the second worker script. During operation, the system executes the first worker script by retrieving the first worker script from a location specified by the first URL. The system also executes the second worker script by retrieving the second worker script from a location specified by the second URL.

In some embodiments of the present invention, the system receives a third command to initialize a second instance of the first worker script within the web browser. In response to the third command, the system: creates a third operating-system thread, wherein the third operating-system thread is associated with a third message queue; starts a third worker script-engine using the third operating-system thread; receives a third message at the third message queue to execute the second instance of the first worker script; and in response to the third message, executes the second instance of the first worker script within the third worker script-engine. Note that the first worker script creates the third command and the third message.

In some embodiments of the present invention, initializing worker scripts involves blocking the root script until the worker scripts have completed initialization.

In some embodiments of the present invention, the scripts are written in the JavaScript™ language.

BRIEF DESCRIPTION OF THE FIGURES

FIG. 5 presents an Application Programming Interface (API) for a worker pool in accordance with an embodiment of the present invention.

DETAILED DESCRIPTION

Figure 1:
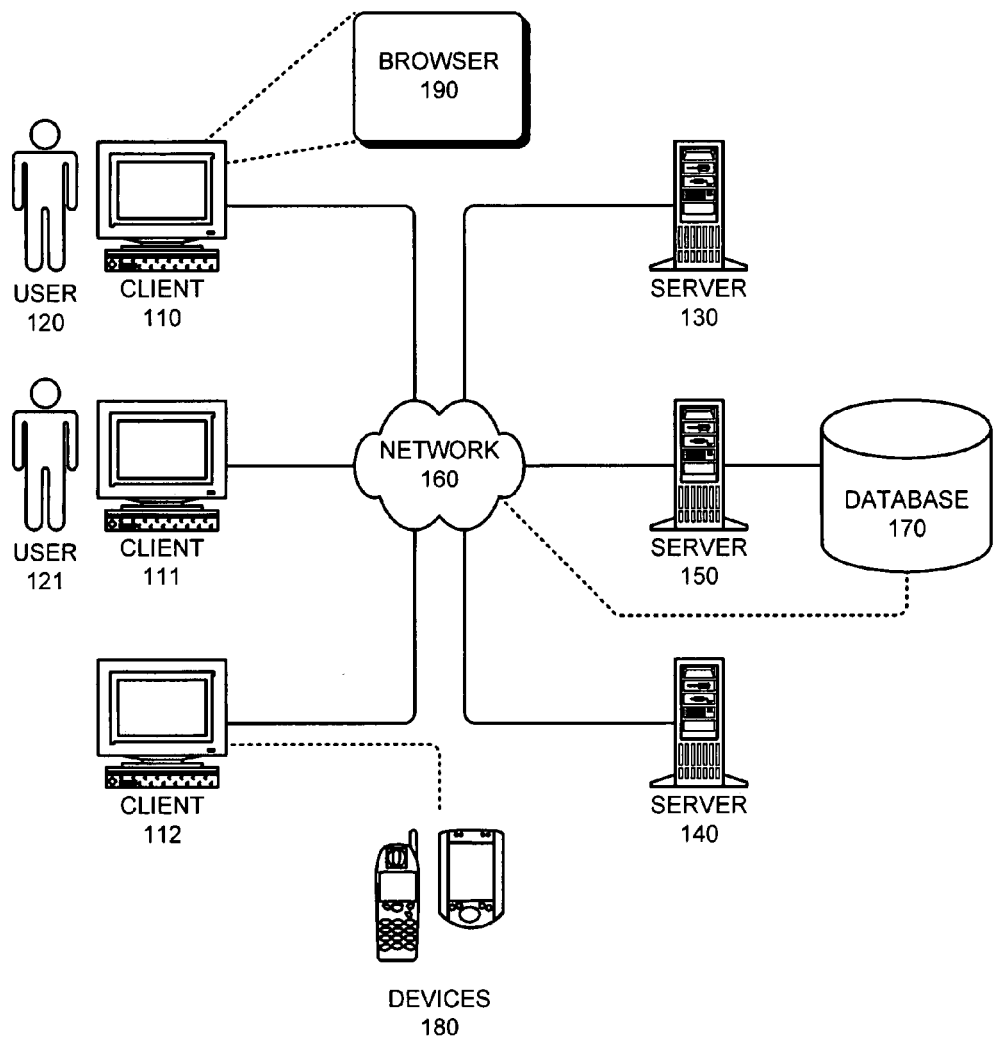
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that extends a scripting language native to a web browser to facilitate executing scripts in parallel within a web browser. During operation, the system receives a first command from a root script to initialize a first worker script within a web browser. In response to the first command, the system: creates a first operating-system thread, wherein the first operating-system thread is associated with a first message queue; starts a first worker script-engine using the first operating-system thread; receives a first message at the first message queue to execute the first worker script; and in response to the first message, executes the first worker script within the first worker script-engine.

In some embodiments of the present invention, the system receives a second command from the root script to initialize a second worker script within the web browser. In response to the second command, the system: creates a second operating-system thread, wherein the second operating-system thread is associated with a second message queue; starts a second worker script-engine using the second operating-system thread; receives a second message at the second message queue to execute the second worker script; and in response to the second message, executes the second worker script within the second worker script-engine. Note that the first thread and the second thread are executed in parallel.

In some embodiments of the present invention, the system receives the root script within the web browser. Next, the system creates a primary operating-system thread, wherein the primary operating-system thread is associated with a primary message queue. Then, the system starts a primary script-engine using the primary operating-system thread. Finally, the system executes the root script within the primary script-engine. The root script creates the first command, the second command, the first message, and the second message.

In some embodiments of the present invention, the system receives a first status message from the first worker script at the primary message queue. The system also receives a second status message from the second worker script at the primary message queue.

In some embodiments of the present invention, the system receives a third command to initialize a third worker script within the web browser. In response to the third command, the system: creates a third operating-system thread, wherein the third operating-system thread is associated with a third message queue; starts a third worker script-engine using the third operating-system thread; receives a third message at the third message queue to execute the third worker script; and in response to the third message, executes the third worker script within the third worker script-engine. Note that the first worker script creates the third command and the third message.

In some embodiments of the present invention, a worker script can send messages to and receive messages from any other worker script. For example, the first worker script may send a message to the second worker script instructing the second worker script to perform a task. Likewise, the second worker script may send a message to the first worker script requesting that the first worker script perform a task.

In some embodiments of the present invention, the system creates the first operating-system thread by creating a first identifier for the first operating-system thread, and returning the first identifier to the root script. The system also creates the second operating-system thread by creating a second identifier for the second operating-system thread, and returning the second identifier to the root script. In some embodiments of the present invention, the root script controls the creation of the first operating-system thread and the second operating-system thread.

In some embodiments of the present invention, the first command includes a first Uniform Resource Locator (URL) that specifies the location of the first worker script, and the second command includes a second URL that specifies the location of the second worker script. During operation, the system executes the first worker script by retrieving the first worker script from a location specified by the first URL. The system also executes the second worker script by retrieving the second worker script from a location specified by the second URL.

In some embodiments of the present invention, the system receives a third command to initialize a second instance of the first worker script within the web browser. In response to the third command, the system: creates a third operating-system thread, wherein the third operating-system thread is associated with a third message queue; starts a third worker script-engine using the third operating-system thread; receives a third message at the third message queue to execute the second instance of the first worker script; and in response to the third message, executes the second instance of the first worker script within the third worker script-engine. Note that the first worker script creates the third command and the third message.

In some embodiments of the present invention, initializing worker scripts involves blocking the root script until the worker scripts have completed initialization. In these embodiments, when creating a worker script, the root script waits synchronously until the worker script is fully initialized. Once the worker script is fully initialized, both the worker script and the root script execute in parallel.

In some embodiments of the present invention, the scripts are written in the JavaScript™ language.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Browser 190 is loaded on client 110. In one embodiment of the present invention, browser 190 can include any program that is capable of displaying web pages that include scripts. Note that browser 190 can be loaded on any computational device, such as clients 110-112, servers 130-150, and devices 180.

Browser

Figure 2:
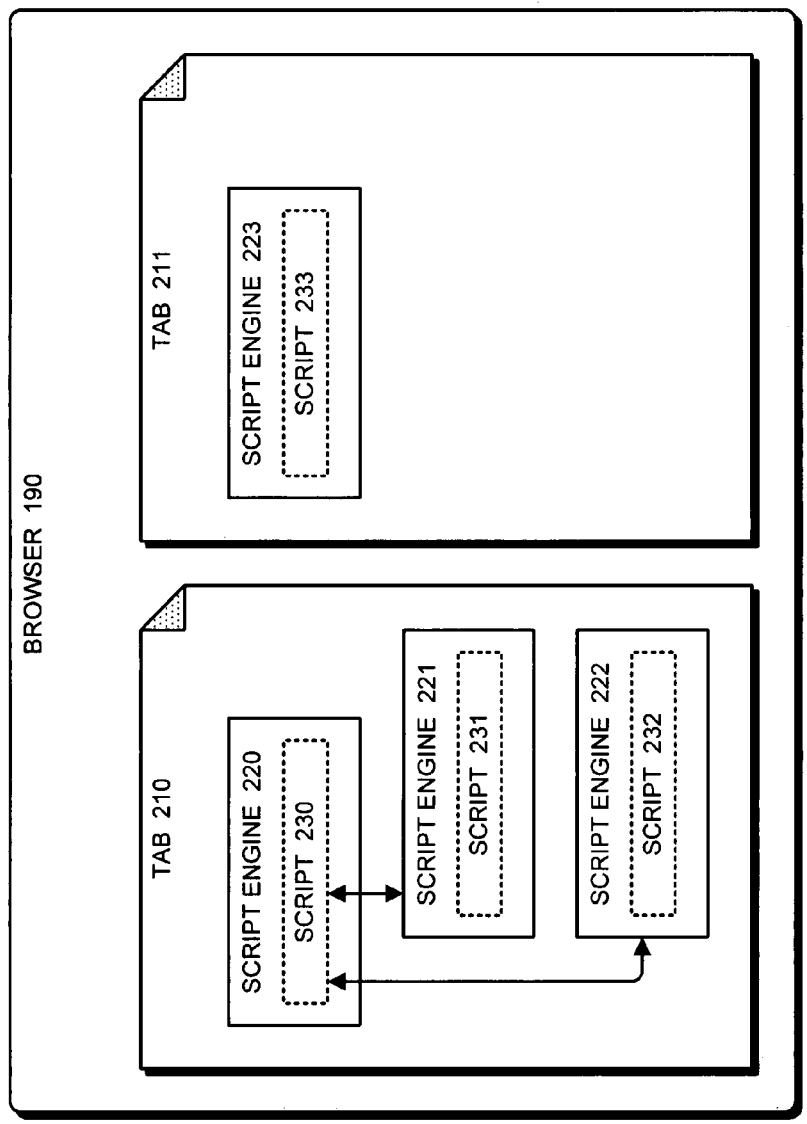
FIG. 2 illustrates a browser in accordance with an embodiment of the present invention.

FIG. 2 illustrates a browser 190 in accordance with an embodiment of the present invention. Browser 190 includes tabs 210-211, which enable browser 190 to execute multiple web pages simultaneously. Note that some embodiments of the present invention utilize browsers that do not support tabs.

Tab 210 includes script engines 220-222. Each of these script engines executes in a separate operating-system thread. Script engines 220-222 include scripts 230-232, respectively. In some embodiments of the present invention, scripts 230-232 are all loaded from the same web page being displayed in tab 210. Similarly, tab 211 includes script engine 223, which includes script 233.

Thread

Figure 3:
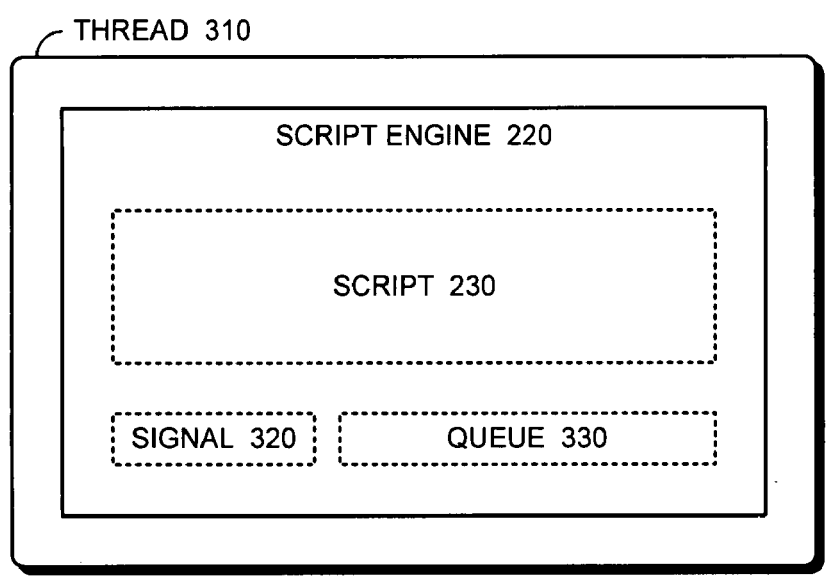
FIG. 3 illustrates a thread in accordance with an embodiment of the present invention.

FIG. 3 illustrates a thread 310 in accordance with an embodiment of the present invention. Thread 310 includes script engine 220. Note that in some embodiments of the present invention, every script engine executes in a different thread. Moreover, script engine 220 includes signal 320 and queue 330. Messages are subsequently delivered to queue 330, and are processed by script engine 220 (according to script 230) when signal 320 is invoked. This is described in more detail below.

Executing Scripts in Parallel

Figure 4:
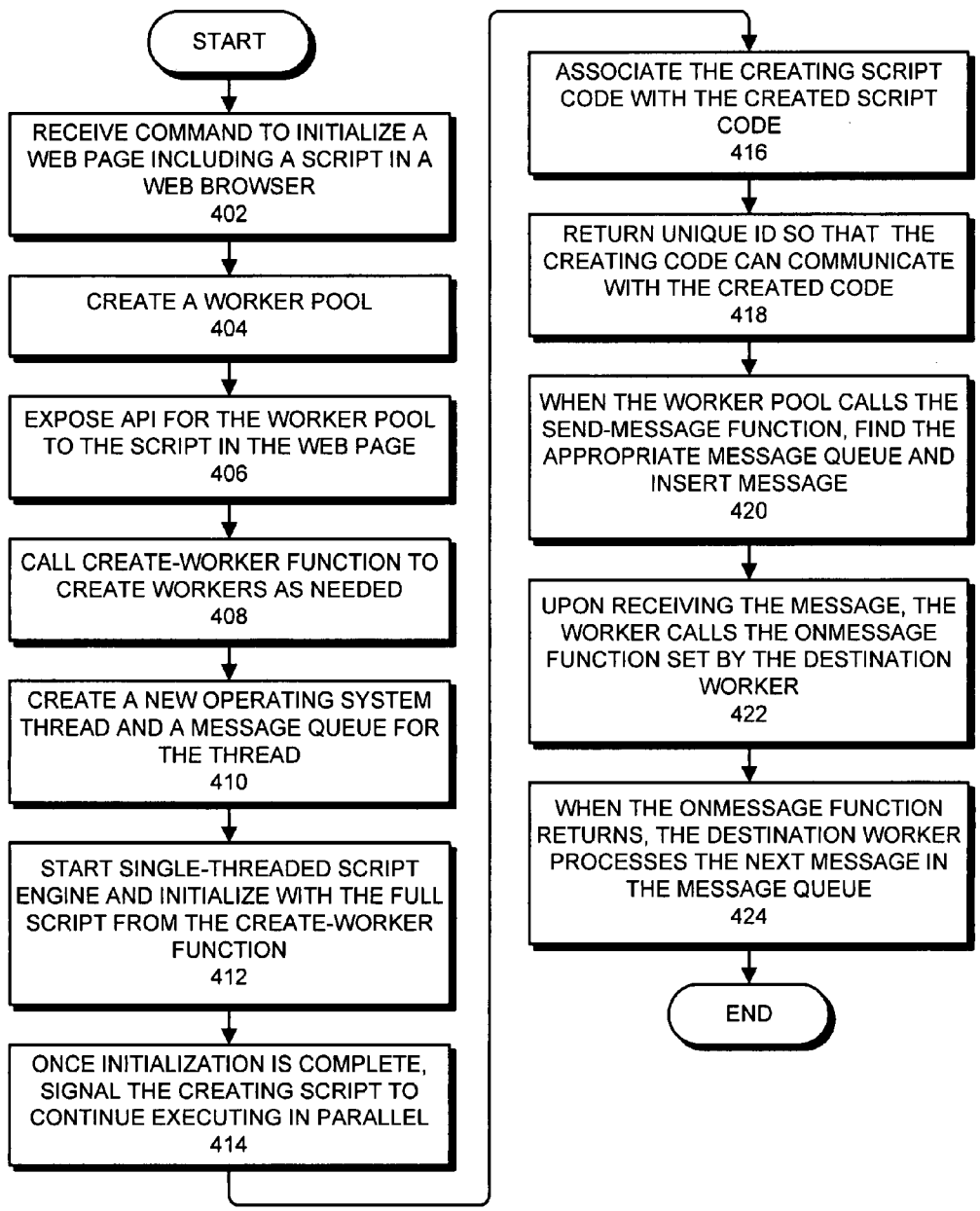
FIG. 4 presents a flow chart illustrating the process of executing scripts in parallel in accordance with an embodiment of the present invention.

FIG. 4 presents a flow chart illustrating the process of executing scripts in parallel in accordance with an embodiment of the present invention. Note that while the following embodiment describes an implementation that utilizes JavaScript™, the present invention is not intended to be limited to the use of JavaScript™, and any scripting language may be used.

During operation, the system receives a command to initialize a web page that includes a script in browser 190 (operation 402). In response to the command, the system creates a worker pool (operation 404) with the following command:
var workerPool=google.scour.factory.create('com.google.workerpool', '1.0');

Note that a worker pool comprises a collection of workers, wherein each worker is an operating-system thread that comprises a script engine and an associated script to execute. Also note that the code that creates the worker pool is implicitly a worker in that pool, so that a web page's "normal" JavaScript™ code gets a worker ID and can receive messages, just like any other worker in the worker pool can.

In response to the command, the system also exposes an Application Programming Interface (API) for the worker pool to the script in the web page (operation 406). For example, FIG. 5 presents an API for a worker pool in accordance with an embodiment of the present invention.

During execution of the JavaScript™ application in the web page, the system calls createWorker (full_script) to create workers as needed (operation 408). In response to createWorker (full_script), the system creates a new operating-system thread and a message queue for this thread (operation 410). (Note that if this is the first createWorker ( ) call in the worker pool, the system also creates a message queue for the 'root' JavaScript™ code.)

Once the thread is created, the thread starts a new single-threaded JavaScript™ engine and initializes it with full_script from the createWorker ( ) call (operation 412). Once initialization is complete, the thread signals the creating JavaScript™ code to continue executing in parallel (operation 414). The thread then waits for messages to enter its queue. In some embodiments of the present invention, full_script is a Uniform Resource Locator (URL) that points to a location that includes the script to be executed.

Note that the system also associates the creating JavaScript™ code with the created JavaScript™ code (operation 416), and returns a unique ID so the creating code can communicate with the created code (operation 418). Any JavaScript™ code can invoke createWorker ( ) including JavaScript™ code that was invoked in a previous createWorker ( ) call. The system may also insert the object google.

scour.workerPool into the created code's global namespace, so the created code can communicate with the worker pool.

When any member of the worker pool calls sendMessage (message, toWorker), the system finds the message queue associated with toWorker, and places message in the destination queue (operation 420). Upon receiving this message, the worker calls the onmessage JavaScript™ function set by the destination worker (operation 422). Finally, when the onmessage function returns, the destination worker processes the next message in the destination worker's queue (operation 424).

By utilizing the worker pool, embodiments of the present invention can execute individual scripts or pieces of scripts in separate script engines in separate threads. Because of the worker pool, the scripting language can include single-threaded scripting languages, and each script engine executes in a single-threaded manner.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for extending a scripting language native to a web browser to facilitate executing scripts within the web browser, the method comprising:
   receiving a first command from a root script to initialize a first worker script within a web browser, wherein the first command includes a first Uniform Resource Locator (URL) that specifies the location of the first worker script; and
   in response to the first command:
      creating a first operating-system thread, wherein creating the first operating-system thread involves creating a first identifier for the first operating-system thread, and returning the first identifier to the root script, and the first operating-system thread is associated with a first message queue;
      starting a first worker script-engine using the first operating-system thread,
      receiving a first message at the first message queue to execute the first worker script, and
      in response to the first message, executing the first worker script within the first worker script-engine, wherein executing the first worker script involves retrieving the first worker script from a location specified by the first URL.

2. The method of claim 1, further comprising:
   receiving a second command from a root script to initialize a second worker script within a web browser, wherein the second command includes a second URL that specifies the location of the second worker script;
   in response to the second command:
      creating a second operating-system thread, wherein creating the second operation-system thread involves creating a second identifier for the second operating-system thread, and returning the second identifier to the root script, and the second operating-system thread is associated with a second message queue,
      starting a second worker script-engine using the second operating-system thread,
      receiving a second message at the second message queue to execute the second worker script, and
      in response to the second message, executing the second worker script within the second worker script-engine, wherein executing the second worker script involves retrieving the second worker script from a location specified by the second URL; and
   wherein the first thread and the second thread are executed in parallel.

3. The method of claim 2, further comprising:
   receiving the root script within the web browser;
   creating a primary operating-system thread, wherein the primary operating-system thread is associated with a primary message queue;
   starting a primary worker script-engine using the primary operating-system thread;
   executing the root script within the primary worker script-engine; and
   wherein the root script creates the first command, the second command, the first message, and the second message.

4. The method of claim 3, further comprising:
   receiving a first status message from the first worker script at the primary message queue; and
   receiving a second status message from the second worker script at the primary message queue.

5. The method of claim 1, further comprising:
   receiving a third command to initialize a third worker script within a web browser;
   in response to the third command:
      creating a third operating-system thread, wherein the third operating-system thread is associated with a third message queue,
      starting a third worker script-engine using the third operating-system thread,
      receiving a third message at the third message queue to execute the third worker script, and
      in response to the third message, executing the third worker script within the third worker script-engine; and
   wherein the first worker script creates the third command and the third message.

6. The method of claim 1, further comprising:
   receiving a third command from a root script to initialize a second instance of the first worker script within the web browser;
   in response to the third command:
      creating a third operating-system thread, wherein the third operating-system thread is associated with a third message queue,
      starting a third worker script-engine using the third operating-system thread,
      receiving a third message at the third message queue to execute the second instance of the first worker script, and
      in response to the third message, executing the second instance of the worker script within the third worker script-engine; and
   wherein the first worker script creates the third command and the third message.

7. The method of claim 1, wherein initializing worker scripts involves blocking the root script until the worker scripts have completed initialization.

8. The method of claim 1, wherein the scripts are written in the JavaScript™ language.

9. A computer-readable storage medium storing instructions that when executed by a computer cause the computer to perform a method for extending a scripting language native to a web browser to facilitate executing scripts within the web browser, the method comprising:

receiving a first command from a root script to initialize a first worker script within a web browser, wherein the first command includes a first Uniform Resource Locator (URL) that specifies the location of the first worker script; and in response to the first command:

creating a first operating-system thread, wherein creating the first operating-system thread involves creating a first identifier for the first operating-system thread, and returning the first identifier to the root script, and the first operating-system thread is associated with a first message queue;

starting a first worker script-engine using the first operating-system thread, receiving a first message at the first message queue to execute the first worker script, and in response to the first message, executing the first worker script within the first worker script-engine, wherein executing the first worker script involves retrieving the first worker script from a location specified by the first URL.

10. The computer-readable storage medium of claim 9, wherein the method further comprising:

receiving a second command from a root script to initialize a second worker script within a web browser, wherein the second command includes a second URL that specifies the location of the second worker script;

in response to the second command:

creating a second operating-system thread, wherein creating the second operation-system thread involves creating a second identifier for the second operating-system thread, and returning the second identifier to the root script, and the second operating-system thread is associated with a second message queue, starting a second worker script-engine using the second operating-system thread, receiving a second message at the second message queue to execute the second worker script, and in response to the second message, executing the second worker script within the second worker script-engine, wherein executing the second worker script involves retrieving the second worker script from a location specified by the second URL; and wherein the first thread and the second thread are executed in parallel.

11. The computer-readable storage medium of claim 10, wherein the method further comprising:

receiving the root script within the web browser;

creating a primary operating-system thread, wherein the primary operating-system thread is associated with a primary message queue;

starting a primary worker script-engine using the primary operating-system thread;

executing the root script within the primary worker script-engine; and wherein the root script creates the first command, the second command, the first message, and the second message.

12. The computer-readable storage medium of claim 11, wherein the method further comprising:

receiving a first status message from the first worker script at the primary message queue; and receiving a second status message from the second worker script at the primary message queue.

13. The computer-readable storage medium of claim 9, wherein the method further comprising:

receiving a third command to initialize a third worker script within a web browser;

in response to the third command:

creating a third operating-system thread, wherein the third operating-system thread is associated with a third message queue, starting a third worker script-engine using the third operating-system thread, receiving a third message at the third message queue to execute the third worker script, and in response to the third message, executing the third worker script within the third worker script-engine; and wherein the first worker script creates the third command and the third message.

14. The computer-readable storage medium of claim 9, wherein the method further comprising:

receiving a third command from a root script to initialize a second instance of the first worker script within the web browser;

in response to the third command:

creating a third operating-system thread, wherein the third operating-system thread is associated with a third message queue, starting a third worker script-engine using the third operating-system thread, receiving a third message at the third message queue to execute the second instance of the first worker script, and in response to the third message, executing the second instance of the worker script within the third worker script-engine; and wherein the first worker script creates the third command and the third message.

15. The computer-readable storage medium of claim 9, wherein initializing worker scripts involves blocking the root script until the worker scripts have completed initialization.

16. The computer-readable storage medium of claim 9, wherein the scripts are written in the JavaScript™ language.

17. A apparatus includes a processor, the apparatus configured to extend a scripting language native to a web browser to facilitate executing scripts within the web browser, comprising:

a receiving mechanism configured to receive a first command from a root script to initialize a first worker script within a web browser, wherein the first command includes a first Uniform Resource Locator (URL) that specifies the location of the first worker script; and a script-execution mechanism, wherein in response to the first command, the script-execution mechanism is configured to:

create a first operating-system thread, wherein create the first operating-system thread involves creating a first identifier for the first operating-system thread, and returning the first identifier to the root script, and the first operating-system thread is associated with a first message queue;

start a first worker script-engine using the first operating-system thread, receive a first message at the first message queue to execute the first worker script, and in response to the first message, execute the first worker script within the first worker script-engine, wherein execute the first worker script involves retrieving the first worker script from a location specified by the first URL.

18. The apparatus of claim 17:
wherein the receiving mechanism is further configured to receive a second command from a root script to initialize a second worker script within a web browser, wherein the second command includes a second URL that specifies the location of the second worker script;
wherein in response to the second command, the script-execution mechanism is further configured to:
create a second operating-system thread, wherein create the second operation-system thread involves creating a second identifier for the second operating-system thread, and returning the second identifier to the root script, and the second operating-system thread is associated with a second message queue,
start a second worker script-engine using the second operating-system thread,
receive a second message at the second message queue to execute the second worker script, and
in response to the second message, execute the second worker script within the second worker script-engine, wherein execute the second worker script involves retrieving the second worker script from a location specified by the second URL; and
wherein the script-execution mechanism is further configured to execute the first thread and the second thread in parallel.

* * * * *